US009604321B1

(12) United States Patent
Amidon et al.

(10) Patent No.: US 9,604,321 B1
(45) Date of Patent: Mar. 28, 2017

(54) REPAIR OF BALLISTIC CONCRETE PANELS

(71) Applicants: Clayton Dean Amidon, Zebulon, NC (US); Mark Alan Siver, Wake Forest, NC (US)

(72) Inventors: Clayton Dean Amidon, Zebulon, NC (US); Mark Alan Siver, Wake Forest, NC (US)

(73) Assignee: 360° BALLISTICS, LLC, Wake Forest, NC (US)

( * ) Notice: Subject to any disclaimer, the term of this patent is extended or adjusted under 35 U.S.C. 154(b) by 406 days.

(21) Appl. No.: 14/268,435

(22) Filed: May 2, 2014

Related U.S. Application Data

(60) Provisional application No. 61/818,873, filed on May 2, 2013.

(51) Int. Cl.
*B23P 6/00* (2006.01)

(52) U.S. Cl.
CPC ....................................... *B23P 6/00* (2013.01)

(58) Field of Classification Search
CPC  B60R 15/00; B63B 17/06; E03D 5/00; E03D 9/00; C10L 9/00; B01F 9/02; F16K 11/22; F01M 9/02; G01N 30/24; A61M 1/0023; A61M 39/06; A61M 16/1095; B64C 1/1453
See application file for complete search history.

(56) References Cited

U.S. PATENT DOCUMENTS

| 3,811,462 | A | * | 5/1974 | Feliz | B60R 15/00 137/240 |
| 3,963,040 | A | * | 6/1976 | Gezari | B63B 17/06 137/899.2 |
| 4,046,582 | A | | 9/1977 | Kawamura | |
| 4,249,948 | A | | 2/1981 | Okada | |
| 4,488,910 | A | | 12/1984 | Nicholson | |
| 4,550,453 | A | * | 11/1985 | Norman | E03D 5/00 134/166 R |
| 4,668,244 | A | * | 5/1987 | Nakamura | C10L 9/00 34/215 |
| 4,737,193 | A | | 4/1988 | Gutmann | |
| 5,456,752 | A | | 10/1995 | Hogan | |
| 5,947,156 | A | * | 9/1999 | Tomczyk | B60R 15/00 137/355.16 |
| 6,006,766 | A | * | 12/1999 | Soulages | E03F 9/00 134/166 C |

(Continued)

OTHER PUBLICATIONS

Technical Specification for Shock Absorbing Concrete (SACON®)—Shock Absorbing Concrete for Constructing Live-Fire Training Facilities, Document metadata bears creation date of Feb. 12, 2007, 25 pages, U.S. Army Corps of Engineers.

(Continued)

*Primary Examiner* — Richard Chang
(74) *Attorney, Agent, or Firm* — Triangle Patents, PLLC

(57) ABSTRACT

Injector assemblies and methods to repair concrete barriers, in particular ballistic concrete barriers used for training facilities used for training with live ammunition. Replacement material is loaded into the injector body and a set of one or more valves are used to allow air pressure to move the replacement material into a vented void in the ballistic panel to fill the void.

17 Claims, 12 Drawing Sheets

(56) References Cited

U.S. PATENT DOCUMENTS

| | | | |
|---|---|---|---|
| 6,218,458 B1 * | 4/2001 | Vidaurre | B01F 9/02 264/240 |
| 6,264,735 B1 | 7/2001 | Bean | |
| 6,423,134 B1 | 7/2002 | Trottier | |
| 6,582,511 B1 | 6/2003 | Velpari | |
| 6,620,236 B2 | 9/2003 | Huntsman | |
| 6,662,803 B2 * | 12/2003 | Gradon | A61M 16/1095 128/205.25 |
| 6,688,811 B2 | 2/2004 | Forrester | |
| 6,758,897 B2 | 7/2004 | Rieder | |
| 7,111,847 B2 | 9/2006 | Larson | |
| 7,243,921 B2 | 7/2007 | Larson | |
| 7,832,252 B2 * | 11/2010 | Watson | G01N 30/24 73/1.05 |
| 8,074,933 B2 * | 12/2011 | Mackulin | B64C 1/1453 137/209 |
| 9,216,367 B1 * | 12/2015 | Caldwell | B01D 17/02 |
| 9,333,318 B2 * | 5/2016 | Cragg | A61M 16/0057 |
| 9,388,095 B2 * | 7/2016 | Leroy | B01J 38/06 |
| 2001/0006991 A1 * | 7/2001 | Vidaurre | B01F 9/02 524/494 |
| 2002/0010436 A1 * | 1/2002 | Becker | A61M 39/06 604/256 |
| 2007/0062143 A1 | 3/2007 | Noushad | |
| 2008/0190488 A1 * | 8/2008 | Hurst | F16K 11/22 137/119.03 |
| 2009/0126700 A1 * | 5/2009 | Weller | F01M 9/02 123/518 |
| 2010/0229715 A1 | 9/2010 | Tonyan | |
| 2010/0230035 A1 | 9/2010 | Frank | |
| 2011/0054389 A1 * | 3/2011 | Do | A61M 1/0023 604/28 |
| 2014/0000227 A1 * | 1/2014 | Pickren | B01D 45/08 55/293 |
| 2014/0150635 A1 * | 6/2014 | Sporn | F41H 5/0485 89/36.02 |
| 2014/0348641 A1 * | 11/2014 | Wilson, Sr. | F03B 17/02 415/151 |
| 2016/0176084 A1 * | 6/2016 | Altonen | B29C 45/77 264/328.12 |

OTHER PUBLICATIONS

Hudson, Kenneth L. et al., Final Report Demonstration of Shock-Absorbing Concrete (SACON) Bullet Trap Technology (Report No. ATC-8183), Aug. 1999, 219 pages, U.S. Army Environmental Center, Aberdeen Proving Ground, MD 21010-5401.

Whiting, David A., Manual on Control of Air Content in Concrete, 1998, 52 pages, Portland Cement Association, Skokie, Illinois, USA.

* cited by examiner

200

200

200

1200

1200

1200

3000

| 3004 | Spray replacement material |
| 3008 | Process plug area |
| 3012 | Process vent hole |
| 3016 | Allow repaired area to partially set |
| 3020 | Spay with water |
| 3024 | Cover repaired area |
| 3028 | Mark as No-Shoot |
| 3032 | Test the test cylinder |
| 3036 | Remove cover and No-Shoot marks |

REPAIR OF BALLISTIC CONCRETE PANELS

This application claims the benefit of U.S. Provisional Patent Application No. 61/818,873 filed May 2, 2013 and incorporates the provisional application by reference.

BACKGROUND

Field of the Disclosure

This disclosure relates generally to equipment and methods to repair concrete barriers, in particular ballistic concrete barriers used for training facilities used for training with live ammunition.

SUMMARY OF THE DISCLOSURE

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

One expression of some of the teachings of the present disclosure may be expressed as a process to fill a void in a proximal face of a ballistic panel with ballistic replacement material, through
  obtaining an injector assembly;
  connecting the injector assembly to a void cover reversibly attached to the proximal face of the ballistic panel;
  creating at least one vent hole to allow replacement material entering the void to push air out of the void through the at least one vent hole; and
  pushing at least a portion of the replacement material used to fill the void through at least one sequence of:
    filling at least a portion of the cavity in the injector assembly with replacement material through the top end of the injector assembly while the inlet valve and outlet valves are closed;
    sealing the top end with the removable cap after filling at least the portion of the cavity;
    opening the inlet valve to allow ingress of pressurized gas into the injector assembly; and
    opening the outlet valve to allow movement of replacement material and pressurized gas through the outlet valve and the outlet continuous to the void through the opening in the void cover into the vented void.

Another expression of some of the teachings of the present disclosure may be expressed as a process to fill a void in a proximal face of a ballistic panel with ballistic replacement material, through:
  obtaining an injector assembly;
  connecting the injector assembly to a void cover reversibly attached to the proximal face of the ballistic panel;
  creating at least one vent hole to allow replacement material entering the void to push air out of the void through the at least one vent hole;
  opening the outlet valve to allow movement of replacement material and pressurized gas through the outlet valve and the outlet continuous to the void through the opening in the void cover into the vented void; and
  pushing at least a portion of the replacement material used to fill the void through at least one sequence of:
    filling at least a portion of the cavity in the injector assembly with replacement material through the top end of the injector assembly while the inlet valve is closed and the outlet valve is open;
    sealing the top end with the removable cap after filling at least the portion of the cavity; and
    opening the inlet valve to allow ingress of pressurized gas into the injector assembly to allow movement of replacement material and pressurized gas through the outlet valve, the outlet contiguous to the void through the opening in the void cover and into the vented void.

Another expression of some of the teachings of the present disclosure may be expressed as a process to fill a void in a proximal face of a ballistic panel with ballistic replacement material, through:
  obtaining an injector assembly;
  connecting the injector assembly to a void cover reversibly attached to the proximal face of the ballistic panel;
  creating at least one vent hole to allow replacement material entering the void to push air out of the void through the at least one vent hole; and
  pushing at least a portion of the replacement material used to fill the void through at least one sequence of:
    filling at least a portion of the cavity in the injector assembly with replacement material through the top end of the injector assembly,
    sealing the top end with the removable cap after filling at least the portion of the cavity; and
    using pressurized gas connected to the gas inlet end of the injector assembly to push replacement material into the vented void.

Another expression of some of the teachings of the present disclosure may be expressed as an injector assembly for use in filling a void in a proximal face of a ballistic panel with ballistic replacement material, with:
  a top end with a removable cap such that replacement material may be loaded into the injector assembly;
  an outlet valve connected to a void cover such that replacement material may travel downward from the top end and leave the outlet valve and travel through the void cover to enter a vented void in the proximal face of the ballistic panel; and
  an inlet valve with an inlet end that may be connected to a pressurized gas source such that
    when the top end is capped with the removable cap and the outlet valve is closed, opening the inlet valve while connected to the pressurized gas source causes the injector assembly to become pressurized; and
    subsequently opening the outlet valve while the inlet valve remains open causes pressurized gas to move replacement material loaded earlier through the top end to move through the outlet valve and the void cover into the vented void in the proximal face of the ballistic panel.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

While one of skill in the art will recognize that the injector system described below through the description of two injector assemblies could be modified in a variety of ways, it is useful to provide a detailed description of one suitable injector in order to introduce components and provide a vehicle for conveying the teachings of the present disclosure. Accordingly, two specific injector assemblies are described in detail below.

Figure 1:
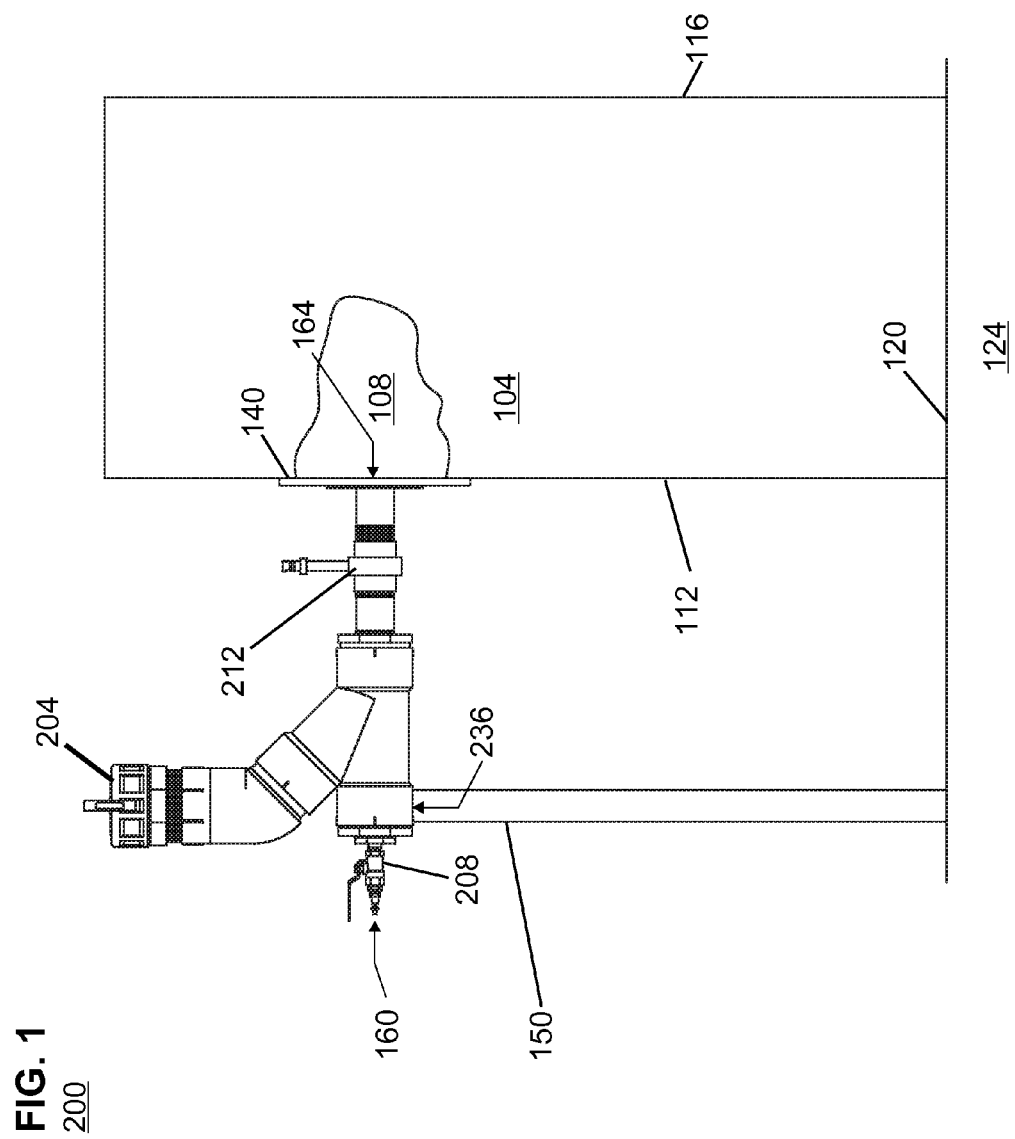
FIG. 1 is a side view of a first injector assembly positioned to fill a void in a ballistic panel.

FIG. 1 is a side view of an injector assembly connected to a ballistic panel with a void. More specifically, FIG. 1 shows a ballistic panel 104 with a base 120 on the ground 124 or some other support surface. A proximal face 112 of the ballistic panel 104 has a void 108 extending from the proximal face 112 a portion of the distance to the distal face 116. Ballistic panels 104 may be used in live-fire training where a series of panels are used to create one or more structures such as a building or a faux tank to allow military or police personnel to train with live ammunition. The ballistic panels are designed to receive the projectile and retain the projectile so that trainees are not injured by ricochets. The ballistic panels 104 may also be used as backstops or safety barriers behind conventional targets or behind ballistic panel shoot houses or other structures.

The ballistic panels 104 may be used in a variety of sizes. The ballistic panels 104 may have a thickness between the proximal face 112 and the distal face 116 of approximately 24 to 30 inches. The thickness may be selected based upon the properties of the ballistic concrete used for the ballistic panel 104 and the anticipated kinetic energy of the ammunition. Thus, a ballistic panel for a backstop behind a pistol range may be a different thickness from a ballistic panel intended to stop rounds from a M-16 rifle (sometimes called AR-15 rifle), or to stop rounds from a 50 caliber machine gun or sniper rifle.

Repeated hits of a ballistic panel 104 in approximately the same location will degrade the panel and begin to create a void 108. In order to maintain the integrity of the ballistic panel 104 as a barrier, these voids 108 need to be filled with material compatible with the purpose of the ballistic panel as a bullet absorbing barrier.

Figure 5:
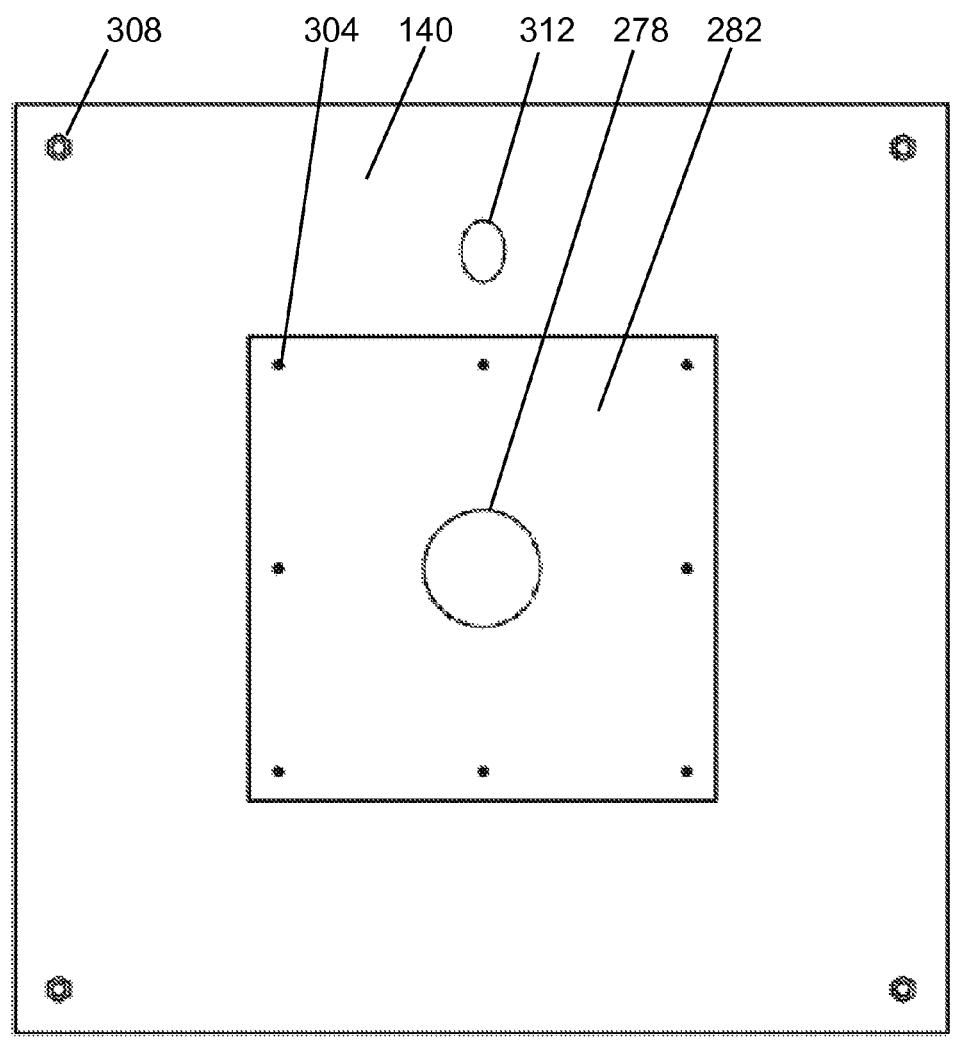
FIG. 5 shows a ballistic panel with a vent hole above the plywood faceplate, steel plate with connected second steel nipple.

FIG. 1 shows an injector assembly 200 connected to a faceplate (or void cover) 140 which is removably attached to the proximal face 112 of the ballistic panel 104 by a set of screws 144 (See FIG. 5). The faceplate 140 may be three quarter inch birch plywood. The screws 144 may be concrete anchors. Optionally, a support beam 150 may be cut to the size needed to support the injector assembly 200 in a substantially horizontal orientation with respect to an opening in the faceplate 140 (discussed below). The support beam 150 helps support the injector assembly 200 as the injector assembly 200 will be filled with replacement material (not shown here) loaded into the injector assembly 200 through an opening on the top end of the injector assembly 200 that is accessible after removing a cap 204. Once the injector assembly 200 is at least partially filled with replacement material and the cap 204 replaced, air pressure may be used to inject the replacement material into the void through the use of inlet valve 208 and outlet valve 212.

Figure 2:
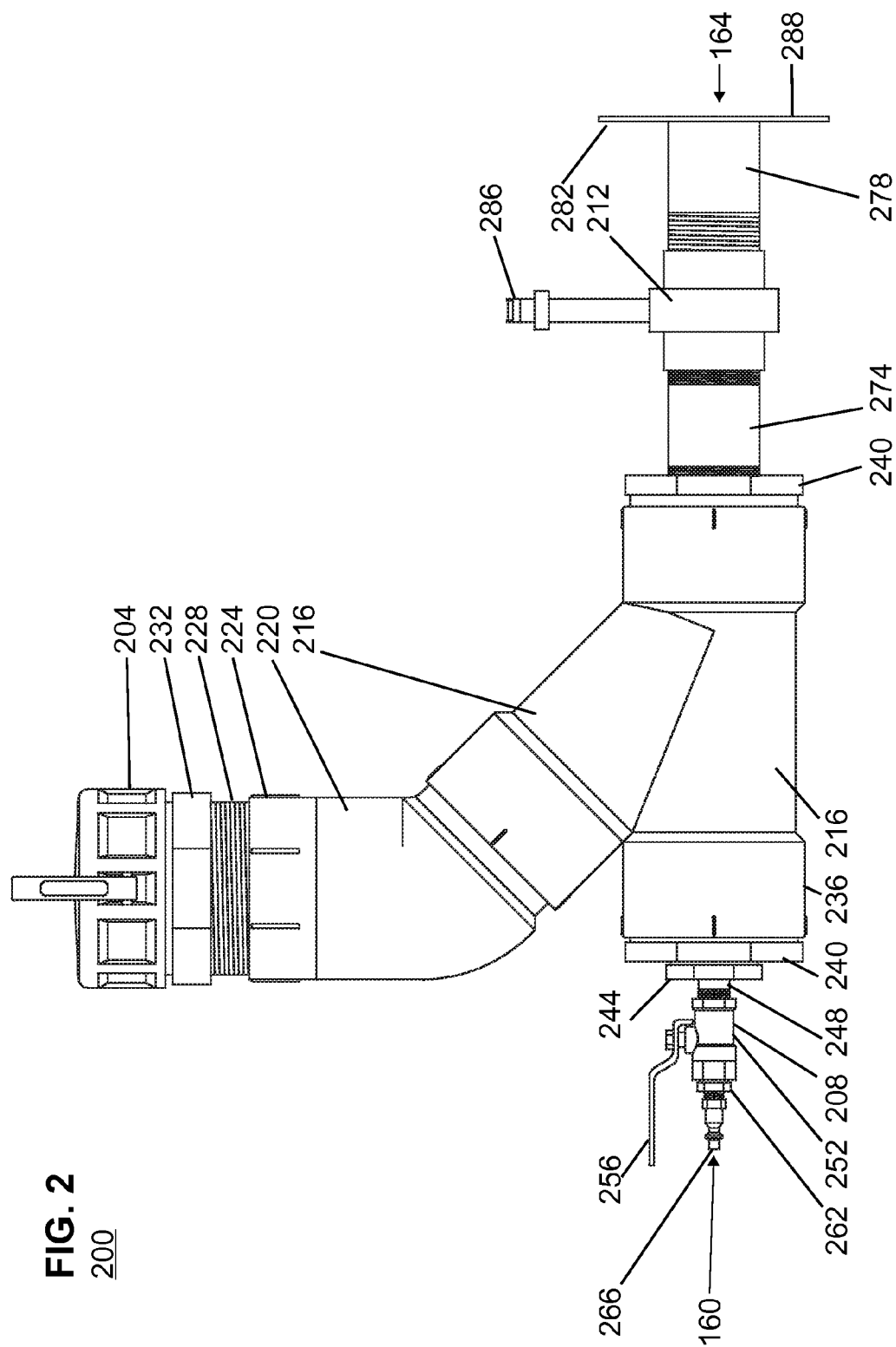
FIG. 2 is a side view of the first injector assembly.

FIG. 2 is a side view of the injector assembly 200. The majority of the interior volume for receipt of replacement material is found within wye 216 and forty-five degree elbow 220 (hereinafter elbow 220). The injector assembly 200 shown in FIG. 2 uses PVC pipe and a variety of metallic components. One of skill in the art knows that when switching from PVC pipe materials to metal components there is often an adapter. If someone built an entire injector assembly out of brass or some other metal, the injector assembly may lack certain adapters as they would not be needed.

FIG. 2 shows the use of a four inch PVC wye which is schedule 80. The nominal pipe sizes and schedules are part of the North American set of standard sizes for pipes where the pipe size is a nominal diameter and the schedule indicates wall thickness.

FIG. 2 shows an elbow 220 that is also a four inch PVC schedule 80 component. A four inch PVC adapter 224 (Schedule 40) attached to the upper end of the elbow 220 (such as by gluing). A four inch PVC nipple 228 (Schedule 80) is connected to the adapter 224. A four inch aluminum coupling adapter 232 is connected to the lower end of cap 204. A cap 204 such as a four inch aluminum dust cap along with the coupling adapter 232 may be repeatedly removed and replaced from the threaded top end of the coupling adapter 232. A preferred way to quickly remove the cap 204 from the injector assembly 200 is through the use of two-piece cap with a camlock. The lower portion of the cap 204 is threadedly engaged with the injector assembly 200 and the top portion of the cap is connected to the bottom portion of the cap with a camlock, which is a fluid fitting known to those of skill in the art for ease of rapidly disconnecting and connecting a fitting. A threaded engagement could be used to disconnect and connect the cap 204 to the injector assembly 200 as the injector assembly is repeatedly filled with replacement material, but threads may be fouled during the introduction of replacement material so a camlock may be a better choice. The combination of the cap 204 and the coupling adapter 232 may be called the cap assembly 202.

The horizontal leg of the wye 216 is shown with a pair of PVC reducer bushings 240 (Schedule 80) that reduce the diameter from a nominal four inches to a nominal two inches. On the inlet end 160 of the wye 216, reducer bushing 240 is connected to a second reducer bushing 244 which is a PVC schedule 80 reducer bushing to reduce from a two inch nominal diameter to a one half inch nominal diameter. A one half inch brass nipple 248 may be threaded into the second reducer bushing 244. An inlet valve 208 may be threadedly connected to the brass nipple 248. The inlet valve 208 may have a one half inch brass ball valve 252 with inlet valve handle 256. The inlet end 160 of the inlet valve 208 may have a one half inch to one quarter inch brass bushing 262. A one quarter inch male coupler 266 may extend from the bushing 262 to allow an air hose (not shown) from a compressed air source to be connected to the inlet valve 208.

Connected to the reducer bushing 240 on the outlet end 164 of the wye 216 is a first steel nipple 274. A second steel nipple 278 is connected to a steel plate 282. The outlet valve 212 may be connected between steel nipples 278 and 274. The outlet valve 212 may by a two inch nominal diameter PVC knife valve with outlet valve handle 286. Those of skill in the art will recognize that there are a number of different valve designs that are used with fluids but will also recognize that some valve designs are more prone to fouling from the sand and grit in the replacement material so certain valve choices will be more reliable and durable than other choices. Many of the viable choices will be types of gate valves such as knife valve, slide valve (sometimes called guillotine valve), or wedge valve. The valve may be made out of brass or some other material and those of skill in the art will be able to make any required transition from PVC piping to brass.

As discussed in greater detail below, the injector assembly 200 may have a pressure regulator before the inlet valve 208 so that the air pressure applied to the injector assembly 200 may be regulated at the inlet of the injector assembly 200 rather than relying on the operator to properly set the compressed air source to limit output to a particular prescribed pressure limit. For example the pressure regulator may be set at 25 PSIG as that pressure provides a pressure gradient to move the replacement material into the void but does not lead to applying to much pressure to the injector assembly 200. A pressure gage used without a pressure regulator may be included before the inlet valve to provide an easy to monitor indication to the operator of the pressure that will be applied to the injector assembly 200 if the inlet valve 208 is opened. This indication provides a warning to the operator that the compressed air source may need to be adjusted if the pressure gage is not indicating a pressure within a prescribed range.

Alternatively, the pressure gage may be used after the pressure regulator and before the inlet valve 208 to offer a confirmation of the proper operation of the pressure regulator.

While injector assemblies may be made of various sizes, an injector assembly 200 as shown in FIG. 2 may have a total length of approximately twenty-seven inches from the distal face 288 of steel plate 282 to the inlet end 160 of the male coupler 266. The end to end length may be longer if a pressure regulator or pressure gage is added to the inlet end of the inlet valve 208.

Figure 3:
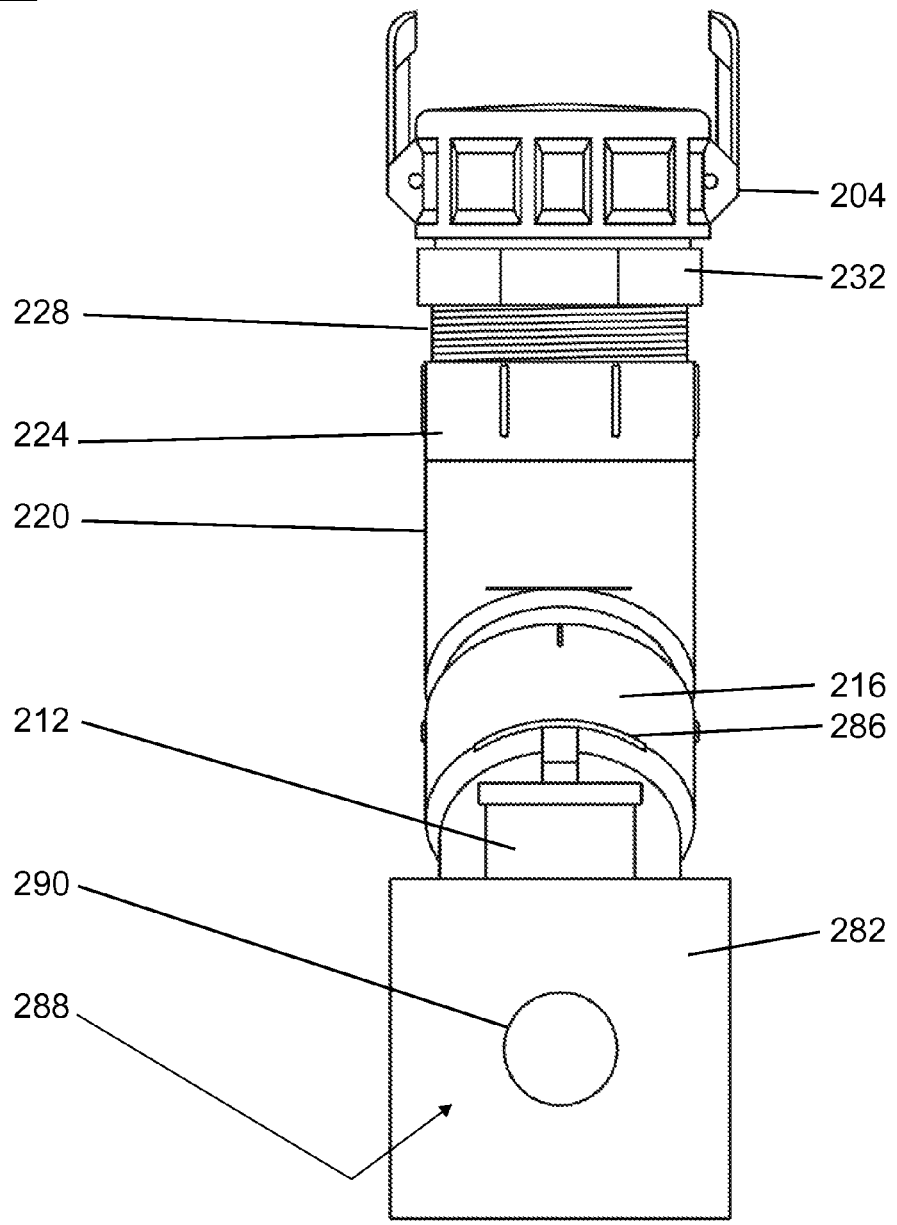
FIG. 3 is a front view of the first injector assembly.

FIG. 3 is a front view of injector assembly 200. Several components introduced during the discussion of FIG. 2 are visible from a different perspective in FIG. 3. Steel plate 282 is shown with the distal face 288 which would be facing the proximal face 112 of ballistic panel 104 (see FIG. 1). The steel plate 282 would be separated from the proximal face 112 of ballistic panel 104 by faceplate 140 which is sized to extend beyond the void 108 in all directions. The injector assembly outlet 290 is aligned with an opening in faceplate 140 to allow injection of a slurry of replacement material into the void 108.

Also visible in FIG. 3 are previously introduced components: cap 204; coupling adapter 232; nipple 228; adapter 224; elbow 220; wye 216; outlet valve 212; and outlet valve handle 286.

While injector assemblies 200 may be made of various sizes, an injector assembly 200 as shown in FIG. 3 may have a total height of approximately twenty inches from the lower end of the steel plate 282 to the top of cap 204.

Figure 4:
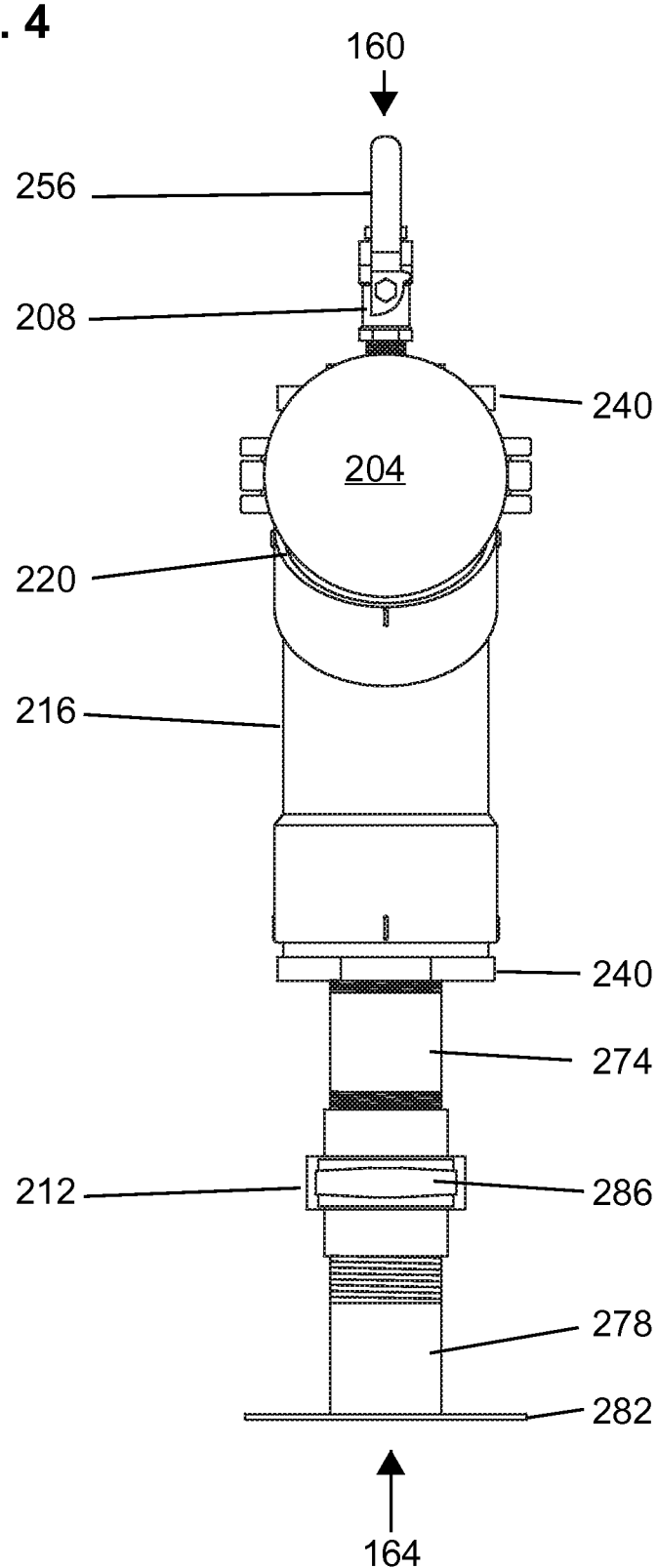
FIG. 4 is a top view of the first injector assembly.

FIG. 4 is a top view of injector assembly 200. This view shows components previously introduced from another view. Moving from the inlet end 160 to the outlet end 164, the visible components are: inlet valve 208 with inlet valve handle 256; reducer bushing 240; cap 204; elbow 220 (barely visible in this view); wye 216; reducer bushing 240; first steel nipple 274; outlet valve 212 with outlet valve handle 286; second steel nipple 278; and steel plate 282.

Sequence of Repair Steps.

Figure 10:
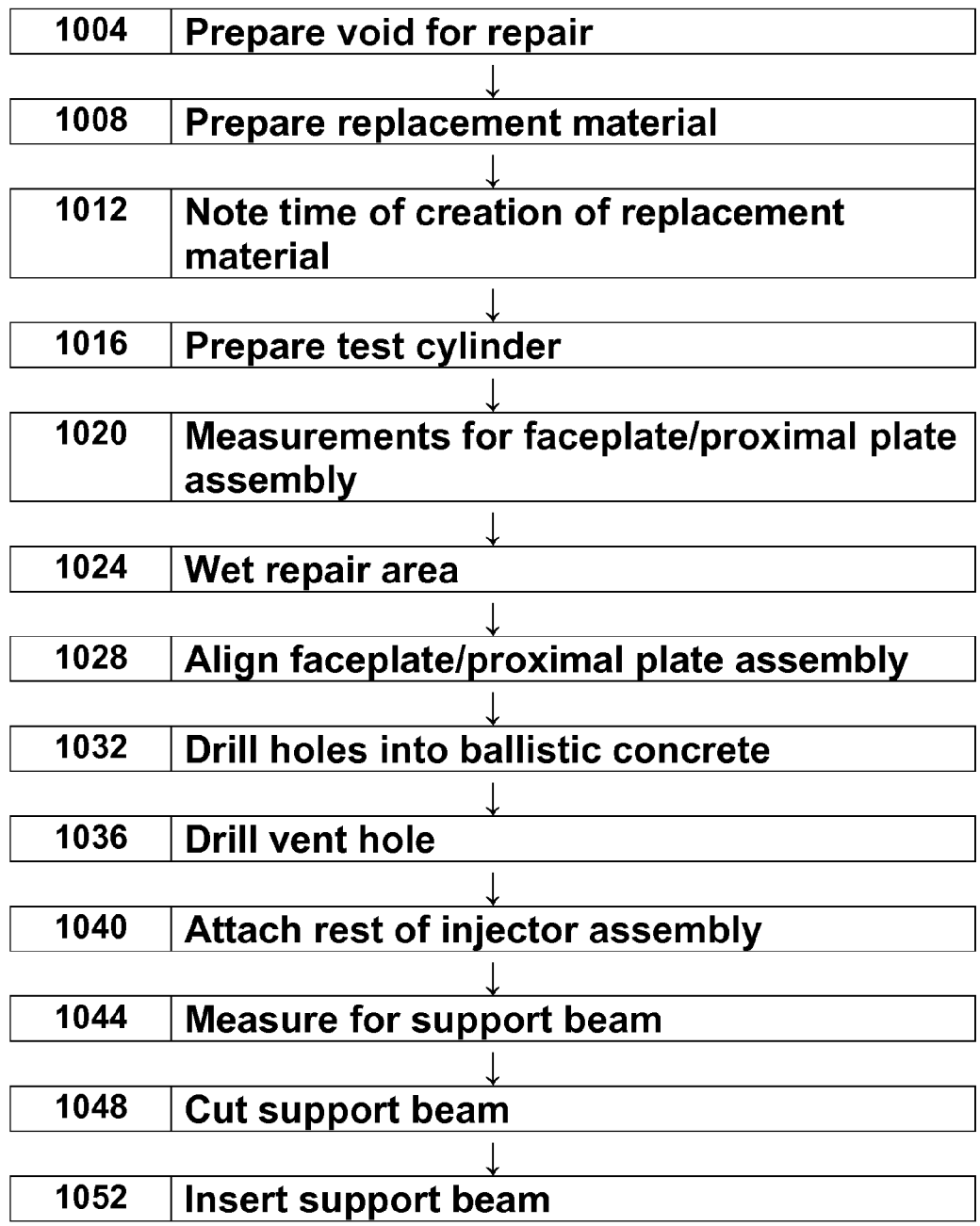
FIG. 10 shows a sequence of steps to prepare to deliver replacement material to repair a void.
Figure 11:
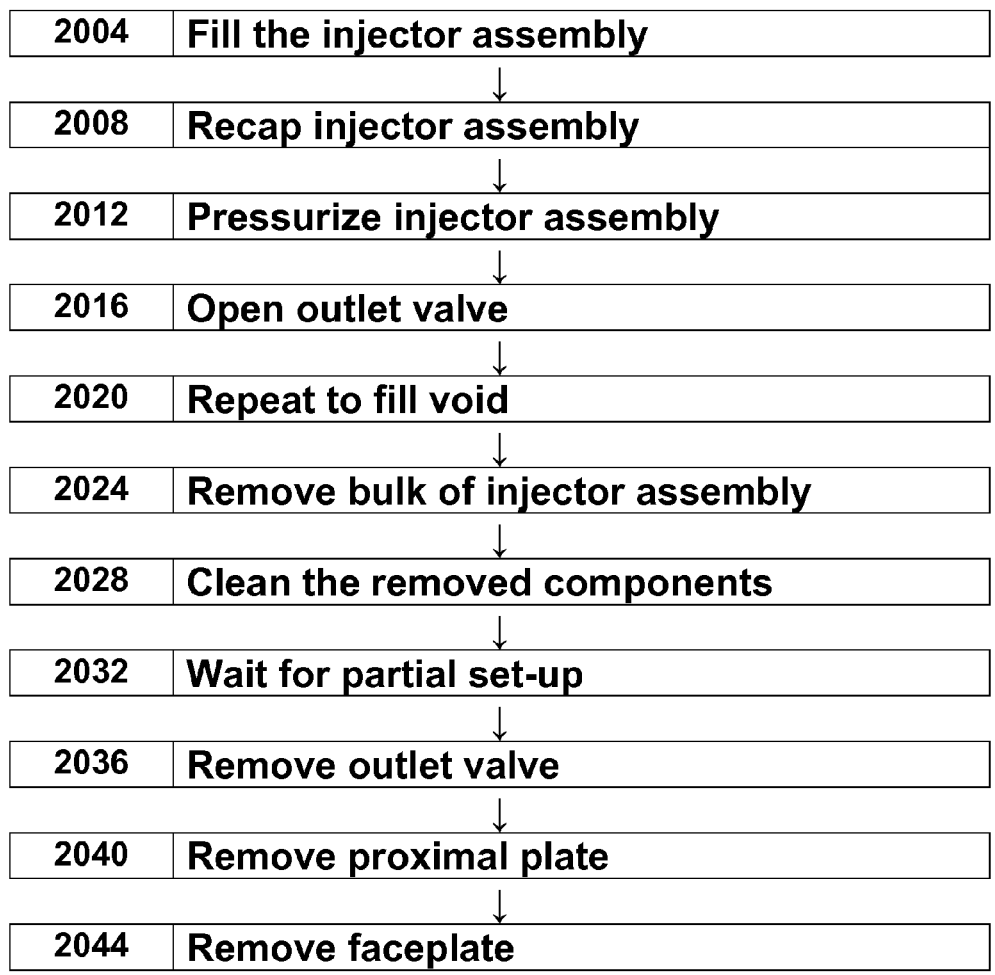
FIG. 11 shows a sequence of steps to fill the void.
Figure 12:
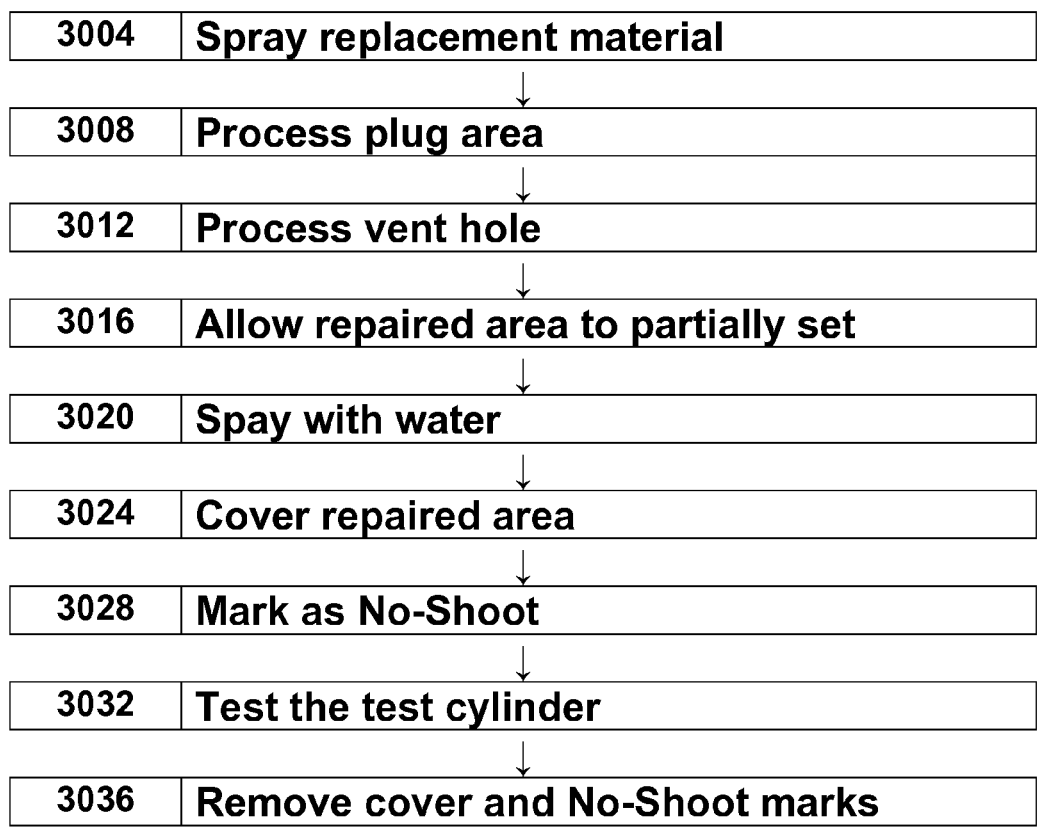
FIG. 12 shows a sequence of steps to process the replacement material after removal of the injector assembly.

FIG. 10 shows a sequence of steps 1000 to prepare to deliver replacement material to repair a void. FIG. 11 shows a sequence of steps 2000 to fill the void. FIG. 12 shows a sequence of steps 3000 to process the replacement material after removal of the injector assembly 200. Those of skill in the art will recognize that some of the steps in these three figures may be done in parallel or the sequence of some steps may be reversed if one step does not require prior completion of another step. The order of the steps presented is not to be deemed as limiting unless the relationship between steps is specified.

Prepare to deliver replacement material.

STEP 1004—Prepare the void 108 for repair. Using rubber gloves (and trowel as appropriate), clean out the void, removing any loose material. Ballistic concrete contains fiber material and there will be fibers extending into the cleaned out void from the ballistic panel. These fibers may be left as is. Fibers remaining in and around the void 108 will help the replacement material to bind to the existing material in the ballistic panel.

STEP 1008—Prepare the replacement material in accordance with manufacturer's instructions. The process for creating suitable replacement material may include periodically stopping the mixing process to weigh a sample such as a quarter cubic foot sample to check if the sample indicates that the replacement material is within a target range for weight per cubic foot. Additional processing may be needed to decrease the weight per cubic foot of the replacement material into a suitable range.

STEP 1012—Once the replacement material is created to manufacturer's specification, note the time, as there may be a need to use the newly made replacement material within a specified time period. For example, the newly created replacement material may need to be used within seventy-five minutes of creation.

STEP 1016—Prepare a Test Cylinder. The test cylinder is used to confirm that the ballistic properties of the replacement material are suitable for the intended use. The test cylinder should be of an appropriate size for the required test process. Fill test cylinder to the top, and level off using the screed tool. Snap the plastic cover on and write the date and time of mix and the location of the repair on the test cylinder. After the test cylinder passes ballistic testing after adequate curing of the replacement material, the repair is successful.

For example, some replacement material may require testing fourteen days after filling the test cylinder.

The precise requirements of the testing process may vary with the intended use of the ballistic panel 104. An example of a ballistic test is testing performed utilizing an M-16 A-2 with a twenty inch barrel or equivalent. The round used is a 5.56 caliber 62 grain green tip round. The round shall be fired from a distance of not greater than 82 feet. Place one round into the center of the cylinder. Measure the depth of the penetration by utilizing a measurement probe. The measured penetration depth should be within the range of one inch to five inches for acceptance. The penetration depth may be measured to the trailing edge of the projectile as measuring to the leading edge of the projectile may not be convenient. A measured penetration depth outside of those parameters means that the replacement material is not suitable for the intended use and the repair should be removed and replaced.

Step 1020—Take measurements to prepare to mount the faceplate/proximal plate assembly. The proximal plate may be the steel plate 282 or another proximal plate such as the aluminum faceplate 1282 discussed below or an analogous plate that connects the outlet of the outlet valve to the opening of the faceplate and the proximal side of the void.

A piece of plywood or other flat surface serves as the faceplate 140 (FIG. 1). The proximal plate such as steel plate 282 and second steel nipple 278 are connected together with the injector assembly outlet 290 of the steel plate 282 aligned with an opening in the faceplate 140. Take measurements of the opening of the void 108 and mark the proximal face 112 of the ballistic panel 104 to help in aligning the injector assembly outlet 290 with the approximate center of the opening of the void 108. The marks need to be sufficiently distant from the opening of the void 108 so that the faceplate 140 may be placed over the void 108 without covering the alignment marks.

Optionally, measure and record the length of the void 108 at the horizontal midline of the void 108 as this measurement may be useful for positioning the vent hole. (discussed below)

Step 1024—Wet the repair area inside and around the void 108 using a spray bottle with water (not shown). There should be no puddling or ponding of water, but the area should be saturated to the point of being thoroughly damp. The purpose of the wetting is to keep the existing ballistic material surrounding the void 108 from quickly drawing water out of the replacement material.

Step 1028—Place the faceplate/proximal plate assembly over the void 108 and align the injector assembly outlet 290 with the approximate center of the opening of the void 108 using the alignment marks.

Step 1032—Using a concrete drill and masonry bit, drill holes through the plywood faceplate 140 into the ballistic concrete around the void 108. These holes are for use with fasteners to hold the faceplate 140 to the proximal face 112 of the ballistic panel 104. A set of six holes may be adequate depending on the size of the faceplate 140. The six holes may be arranged with two holes to the right and to the left of the void and one hole above and below the void. Other patterns may be used. As ballistic concrete differs from conventional concrete, it may be necessary to modify the normal instructions for pilot holes for fasteners. For example, for a fastener used in conventional concrete that normally uses a one quarter inch pilot hole, it may be useful to use a pilot hold made with a three-sixteenth inch drill bit.

Step 1036—Drill the vent hole. Take one half the previously measured length of the void opening and mark a spot above the centerline of the opening in the proximal plate such as second steel nipple 278. Drill a vent hole using a three-quarter inch masonry bit at approximately a forty five degree angle so that the drill bit breaks through the existing ballistic material into the void 108 about halfway towards the back of the void 108. This will provide a vent hole 312 to allow air to leave the void 108 as replacement material is injected into the void 108. While the vent hole 312 shown in FIG. 5 is drilled through the faceplate 140, those of skill in the art will recognized that depending on the size and placement of the faceplate 140, the vent hole 312 could be drilled above the top edge of the faceplate 140. While a single vent hole 312 may be sufficient for many applications, those of skill in the art will recognize that the process may include more than one vent hole, especially for a larger or irregularly shaped void.

Those of skill in the art will recognize that some modification on the starting point and angle of the vent hole may be appropriate for an unusually shaped void.

Alternatively, the vent hole can be placed an inch or so above the top of the proximal plate such as steel plate 282 and the vent hole can be drilled at a horizontal or slight downward angle to intersect with the void. As the operation of the injector assembly is apt to drive replacement material to the back of the void 108, the void 108 will fill from the back to the front. A small gap may occur along the front wall of the void 108 as material may fill the vent hole 312 before the top portion of the front of the void 108 is filled. This small gap can be filled with troweled material during the surface clean up after removing the faceplate 140.

FIG. 5 shows the status after the completion of the preceding step. Visible in FIG. 5 are the plywood faceplate 140 and the steel plate 282 with connected second steel nipple 278. A set of eight fasteners 304 connecting steel plate 282 to faceplate 140 is visible in FIG. 5. The fasteners 304 may be sheetrock screws of appropriate length for the choice of faceplate 140 such as three quarters inch birch plywood. Should a fastener protrude from the distal face of the faceplate 140, the tip of the fastener may be broken off or otherwise removed. Minor surface imperfections caused by the fastener 304 extending beyond the distal face of the faceplate 140 may be corrected at the end when other imperfections are addressed.

Two of the fasteners 308 which hold the faceplate 140 to the proximal face 112 of ballistic panel 104 are visible. Also visible is the proximal opening of the vent hole 312.

Note an analogous view of this step using injector assembly 1200 (discussed below) would show proximal plate 1280 and the holes for connecting the outlet pipe 1278 to the outlet valve 1212.

Step 1040—Screw the rest of the injector assembly to the second steel nipple 278. When done, the cap 204 should be the highest point of the injector assembly 200 so that a slurry of replacement material may be poured into the injector assembly 200 with the cap 204 removed.

Step 1044—Measure for the Support Beam. Measure the distance between the location for the support beam 236 (FIG. 1) on the inlet end 160 of wye 216 and the ground 124.

Step 1048—Cut a Support Beam. Cut a two by four or other suitable board to form a support beam 150 with the length measured in the preceding step. One of skill in the art will recognize that a jack stand or jack may be used in lieu of a support beam.

Step 1052—Insert the support beam 150 to support the inlet end 160 of the injector assembly 200 as the injector assembly 200 will become significantly heavier when filled with replacement material. One of skill in the art will recognize that a small injector assembly 200 that does not weigh an undue amount relative to the stiffness and length of the injector assembly may be operated without a support beam.

Filling the void.

FIG. 11 shows a sequence of steps 2000 for using a mounted injector assembly 200 to deliver replacement material to a void 108.

Step 2004—Fill the Injector Assembly. Close the inlet valve 208 and outlet valve 212. Remove the cap 204 (via camlock, threaded engagement or whatever is used to remove and replace the cap to hold it against pressure). Use a scoop or other suitable tool to load replacement material into the uncapped injector assembly 200. Depending on the height of the opening to the injector assembly 200, it may be necessary to use a step ladder or other lifting device. The lifting device may be a forklift platform or a scissor lift, or other device to allow access to an injector assembly a distance above the ground.

Step 2008—Recap the Injector Assembly. Use a spray bottle to spray water to remove replacement material from any location that would interfere with closing the cap 204. This is frequently necessary when using a cap that is removed and replaced through treaded engagement.

Step 2012—Pressurize the Injector Assembly. Attach an air hose to male coupler 266 at the inlet end 160 of the injector assembly 200. The air hose should be connected to a source of compressed air such as a portable air compressor (not shown). One of skill in the art will appreciate that an oil-free compressor would be preferred in order to avoid injecting oil into the replacement material. The setting for the air compressor output will be a function of the air injector assembly and may be limited by the type of replacement material used as some replacement material may not tolerate being subjected to high pressures as they may alter the properties of the replacement material and divergence in ballistic properties relative to the replacement material in the test cylinder. A suitable for air compressor setting for an injector assembly made with schedule 80 PVC components is 25 psi (gage pressure). The pressure should be set before turning on the compressor.

As referenced above, the injector assembly may include a pressure regulator which will limit the pressure seen by the inlet valve 208 to a prescribed value such as 25 PSIG. A pressure gage may be placed inline before the inlet valve 208 to allow the operator to ensure that the pressure regulation performed at the air compressor or at the pressure regulator is working to limit the pressure to within a prescribed range or limit. Open the inlet valve 208 to allow air pressure to pressurize the injector assembly 200.

Step 2016—Open the Outlet Valve. Opening of the outlet valve 212 will cause the pressurized replacement material to move to through the outlet valve 212 through the second steel nipple 278 and out the injector assembly outlet 290 on the distal face of the faceplate 140 into the lower pressure of the vented void 108. The void 108 does not become pressurized as the vent hole 312 allows air to leave the void 108. It may be helpful to close the inlet valve 208 to allow the portable air compressor to build up pressure and then open the inlet valve 208 to move more replacement material. Once the replacement material has been substantially removed from the injector assembly 200, there will be a perceptible change in sound or vibration of the injector assembly 200 as compressed air travels through the injector assembly 200.

Step 2020—Repeat Process to Completely Fill the Void. Unless replacement material is seen leaving the upper opening in the vent hole 312, more replacement material is needed. Repeat steps 2004, 2008, 2012, and 2016 until replacement material leaves the upper opening in the vent hole 312. Continue to use a spray bottle to spray water to remove replacement material from any location that would interfere with closing the cap 204.

Step 2024—Remove the Bulk of the Injector Assembly. After replacement material seeps out the top of the vent hole 312, close the inlet valve 208 and then the outlet valve 212. Remove the air compressor hose from the male coupler 266 at the inlet end 260 of the inlet valve 208. Rotate the injector assembly 200 to unthread the outlet valve 212 from the first steel nipple 274 to leave the outlet valve 212 on the second steel nipple 278 that is attached to the steel plate 282 (proximal plate).

Step 2028—Clean the Removed Portion of the Injector Assembly. Clean the injector assembly components thoroughly before the replacement material hardens.

Step 2032—Wait for the Replacement Material in the Void to Partially Set-Up. This may take in the range of 35-40 minutes depending on the weather conditions, the replacement material used, and other factors. The process of setting up can be observed by looking at replacement material present on the inlet side of the outlet valve 212.

Step 2036—Remove the Outlet Valve. Once the replacement material in the outlet valve 212 has set up sufficiently, unthread the outlet valve 212 from the second steel nipple 278. Clean the outlet valve 212 thoroughly.

Step 2040—Remove the Proximal Plate. Remove the fasteners 304 that hold the proximal plate such as steel plate 282 to the faceplate 140. A cross-tip bit may be used depending on the fastener used. After the proximal plate is removed, replacement material will be visible through a corresponding 2 inch diameter hole in the faceplace 140. Once the replacement material visible in the hole in the faceplate 140 is sufficiently set up, then proceed to the next step.

Step 2044—Remove the Faceplate. Once the replacement material is set-up, remove the fasteners 308 holding the faceplate 140 to the proximal face 112 of the ballistic panel 104.

Post-processing the replacement material.

FIG. 12 shows a sequence of steps 3000 to process the replacement material after removal of the injector assembly 200.

Step 3004—Spray the Replacement Material with Water. Spray the replacement material visible with the faceplate 140 removed to keep the area moist so it can be worked.

Step 3008—Process the Plug Area. The process will leave a plug of approximately two inches of diameter that extends from the proximal face 112 of the ballistic panel 104 as this material was extending through the opening in the faceplate 140 and at least partially filling the second steel nipple 278. Knock off the protruding plug and work the surface of the replacement material over the entire surface of the filled void to smooth the surface. Any marks from fasteners 304 that extend beyond the faceplate 140 can be addressed in this step. Sprayed water and troweling additional replacement material may be required.

Step 3012—Process the Vent Hole. Likewise, remove any protruding material from the vent hole 312 and work the area to provide a smooth surface. Any holes from the fasteners 308 in the ballistic panel 104 can be filled with replacement material at this time.

Step 3016—Let the Repaired Area Set. Let the repaired surfaces set for several minutes. Inspect to ensure that the surface of the repaired area has set sufficiently to proceed to the next step.

Step 3020—Spray the Void and Vent Hole with Water. Soak the areas to saturation.

Step 3024—Cover the Repaired Area. Place plastic film over the repaired area and seal with duct tape to hold in the moisture on the repairs. Expect to see condensation on ballistic panel side of the plastic film.

Step 3028—Mark the Area with a No-Shoot Indicator. For example, one might use bright red tape or other warning tape to mark the perimeter of the area to indicate that the repaired area should not be shot and should not be behind a target that is used. A date may be written on the tape along with a unique identifier for the test cylinder in case there are many different repairs and different test cylinders.

Step 3032—Test the Test Cylinder. After the replacement material in the test cylinder has cured sufficiently for testing, test the test cylinder to ensure that replacement material meets the ballistic criteria.

Step 2036—Remove the Plastic and Warning Tape. After the test of the test cylinder confirms that the replacement material meets the ballistic criteria, the plastic film and all tape may be removed and this portion of the ballistic panel may be used without restriction.

Second Example of an Injector Assembly.

Figure 6:
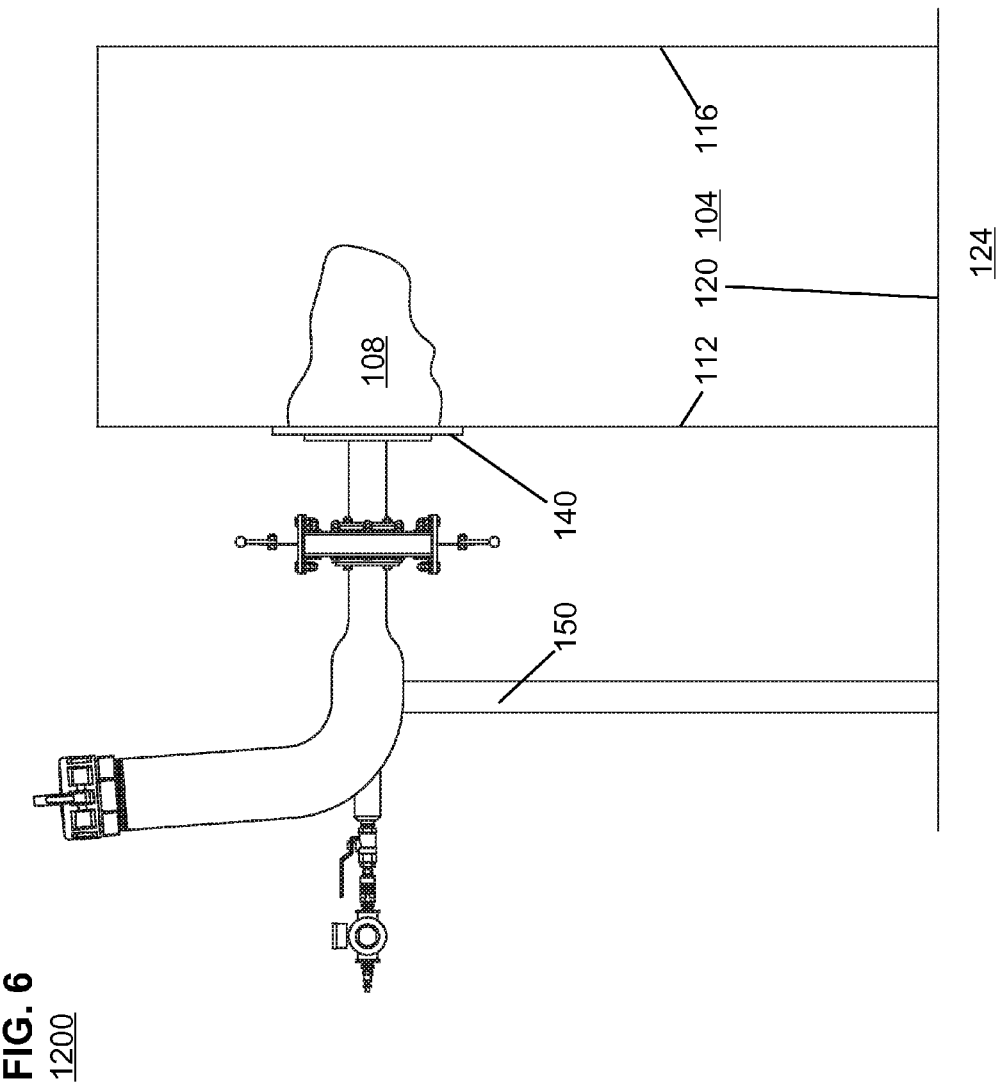
FIG. 6 is a side view of a second injector assembly positioned to fill a void in a ballistic panel.

A second injector assembly 1200 is shown in FIG. 6 which is a side view of an injector assembly 1200 connected to a ballistic panel 104 with a void 108. More specifically, FIG. 6 shows a ballistic panel 104 with a base 120 on the ground 124 or some other support surface. A proximal face 112 of the ballistic panel 104 has a void 108 extending from the proximal face 112 a portion of the distance to the distal face 116. FIG. 6 shows an injector assembly 1200 connected to a faceplate 140 which is removably attached to the proximal face 112 of the ballistic panel 104 by a set of fasteners such as screws 144 (See FIG. 5) such as concrete anchors. The faceplate 140 may be three quarter inch birch plywood. Optionally, a support beam 150 may be cut to the size needed to support the injector assembly 1200 in a substantially horizontal orientation with respect to an opening in the faceplate 140 (discussed below). The support beam 150 helps support the injector assembly 1200 as the injector assembly 1200 will be filled with replacement material (not shown here) loaded into the injector assembly 1200 through an opening on the top end of the injector assembly 1200 that is accessible after removing a cap 1204. Once the injector assembly 1200 is at least partially filled with replacement material and the cap 1204 replaced, air pressure may be used to inject the replacement material into the void through the use of inlet valve 208 and outlet valve 1212. (Valves shown in FIG. 7)

Figure 7:
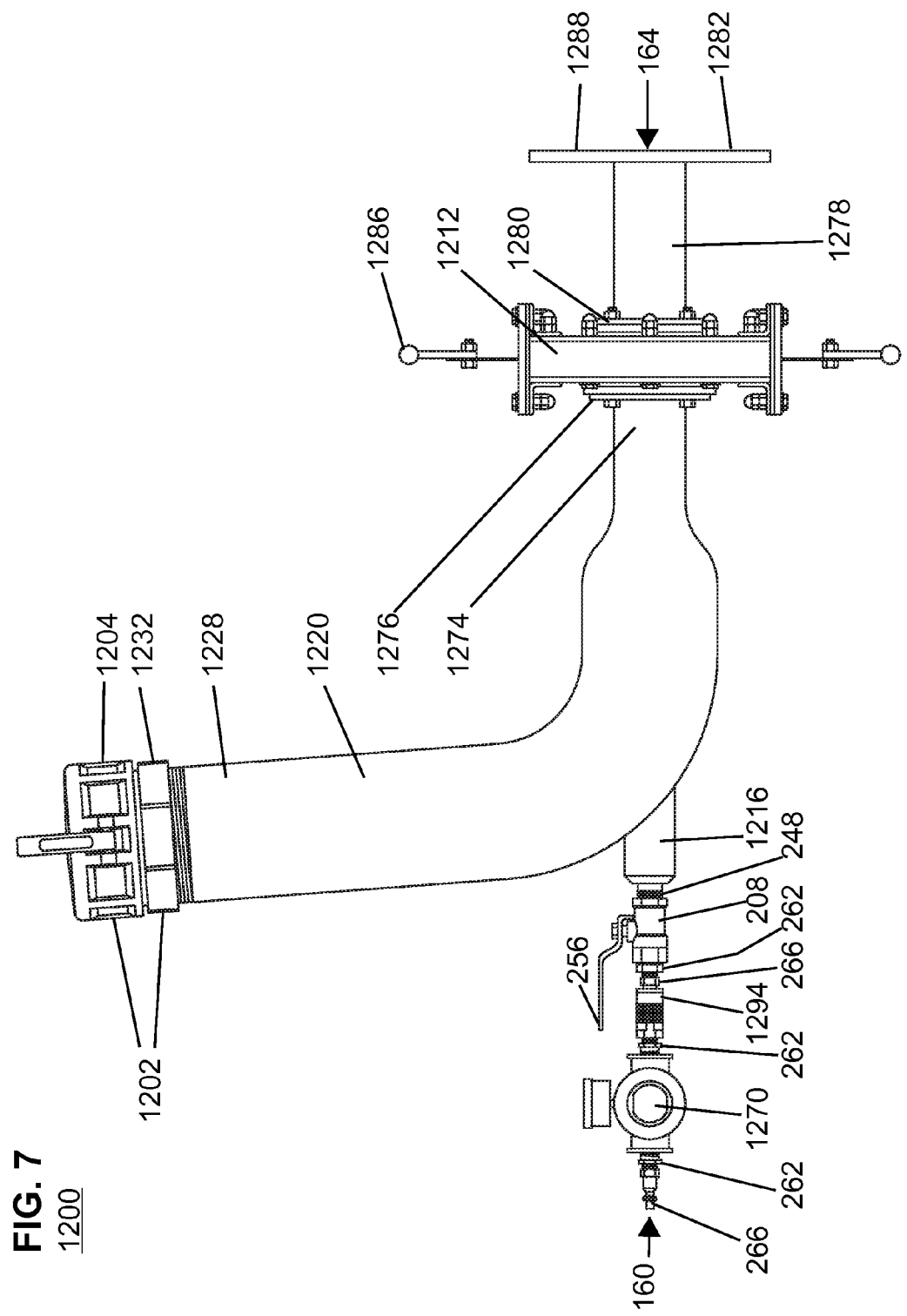
FIG. 7 is a side view of the second injector assembly.

FIG. 7 is a side view of the injector assembly 1200. The majority of the interior volume for receipt of replacement material is found within injector body 1220. The injector assembly 1200 shown in FIG. 7 uses an injector body 1220 that is a manufactured nominal four inch aluminum pipe assembly that reduces to a nominal two inch pipe and has an inlet protrusion 1216. The three ends of the injector body 1220 are: the threaded top 1228; inlet protrusion 1216; and outlet end 1274. Thus, injector body 1220 replaces the wye 216 and elbow 220 from FIG. 2. Injector body 1220 may be made from a material such as schedule 40 aluminum pipe. Those of skill in the art will recognize that other materials can be used based on design choice for pressure used to pressurize the injector assembly 1200, desire to hold down the weight of the injector assembly 1200, desire to have a durable assembly given the abrasive qualities of the replacement materials, and other design criteria.

Both injector assembly 200 and injector assembly 1200 have a cap 204 or 1204 located above a line running between the inlet valve 208 and the outlet valve 212 or 1212. By having the opening in the top of the injector assembly some distance above the valves, the upper portion of the injector assembly serves as a reservoir for replacement material. As indicated in FIG. 7 the teachings of the present disclosure do not require that the upper portion of the injector assembly 1200 be oriented in a pure vertical orientation. Filling the injector assembly 1200 with a quantity of replacement material works well as long as the upper portion has a substantial vertical orientation. In many instances this may be closer to pure vertical than 45 degrees but one could make an injector assembly with an upper portion oriented at 30 degrees or some other angle less than 45 degrees as long as gravity helps deliver replacement material to the portion of the injector assembly 1200 between the inlet valve 208 and the outlet valve 1212.

A cap 1204 such as a four inch aluminum dust cap may be repeatedly removed and replaced via a camlock, threaded engagement, or other design choice suitable for repetitive use in the field and the desire to pressurize the injector assembly 1200. The combination of the cap 1204 and the coupling adapter 1232 may be called the cap assembly 1202.

The outlet end of the injector body 1220 reduces to a two inch nominal diameter. The inlet end 160 of the inlet protrusion 1216 has a one half inch nominal diameter threaded opening which may be engaged by a brass nipple 248. An inlet valve 208 may be threadedly connected to the brass nipple 248. The inlet valve 208 may be a one half inch brass ball valve with inlet valve handle 256. The inlet end 160 of the inlet valve 208 may have a one half inch to one quarter inch brass bushing 262. A one quarter inch male coupler 266 extends from the bushing 262 to connect an air coupler 1294. A one half to one quarter inch bushing 262 connects the inlet end of the air coupler 1294 to a pressure regulator 1270. Another one half to one quarter inch bushing 262 connects the pressure regulator 1270 to a one quarter inch male coupler 266. An air hose from a compressed air source (not shown) may be connected to the one quarter inch male coupler 266 on the inlet end 160 of the injector assembly 1200.

Those of skill in the art will recognize that other components with larger or smaller interior diameters may be used to provide compressed air to the inlet protrusion 1216 without deviating from the teachings of the present disclosure.

Connected to the outlet end 1274 of the injector body 1220 is an outlet valve 1212 with actuator 1286. The outlet end 1274 of the injector body 1220 may have a distal plate 1276 that may be a four inch square plate that is welded to surround the aluminum pipe to allow the outlet end 1274 of the injector body 1220 to be bolted to the inlet end 160 of the outlet valve 1212.

Note that a push-pull actuator with two handles on either side of the outlet valve 1212 may be advantageous for use as the actuator 1286. Placement of the push-pull actuator such that the outlet valve 1212 is closed when the actuator 1286 is in the up position allows downward pressure against the pressurized replacement material which may be the more difficult change in valve position to be done with the least risk of dislodging the injector assembly from the support beam 150. Horizontal orientation for the push-pull actuator may be implemented if additional caution is used to avoid pushing the injector assembly 1200 off the support beam 150. An injector assembly/support beam interaction that would keep the injector assembly 1200 supported even after some horizontal movement of the inlet end 160 of the injector assembly 1200 may be acceptable. For a smaller injector assembly that is not supported by a support beam, the outlet valve 1212 may be oriented so that the actuator 1286 is down when the valve is closed so that the force to move the actuator is not added to the weight of the filled injector assembly 1200 when the actuator 1286 is moved to open the pressurized injector assembly 1200.

Those of skill in the art will recognize that there are a number of different valve designs that are used with fluids but will also recognize that some valve designs are more prone to fouling from the sand and grit in the replacement material, so certain valve choices will be more reliable and durable than other choices. Many of the viable choices will be types of gate valves such as knife valve, slide valve (sometimes called guillotine valve), or wedge valve.

Connected to the outlet end 164 of the outlet valve 1212 is the outlet pipe 1278 which may be a two inch schedule 40 aluminum pipe welded to an aluminum faceplate 1282. The outlet pipe 1278 has a proximal plate 1280 that may be a four inch square plate that is welded to surround the aluminum pipe to allow the outlet pipe 1278 to be bolted to the outlet end 164 of the outlet valve 1212.

While injector assemblies 1200 may be made of various sizes, an injector assembly 1200 as shown in FIG. 7 may have a total length of approximately three feet from the from the distal face 1288 of aluminum faceplate 1282 to the inlet end 160 of the male coupler 266 on the inlet end 160 of the pressure regulator 1270. The length may be longer if an optional pressure gage was included between the pressure regulator 1270 and the inlet valve 208.

Figure 8:
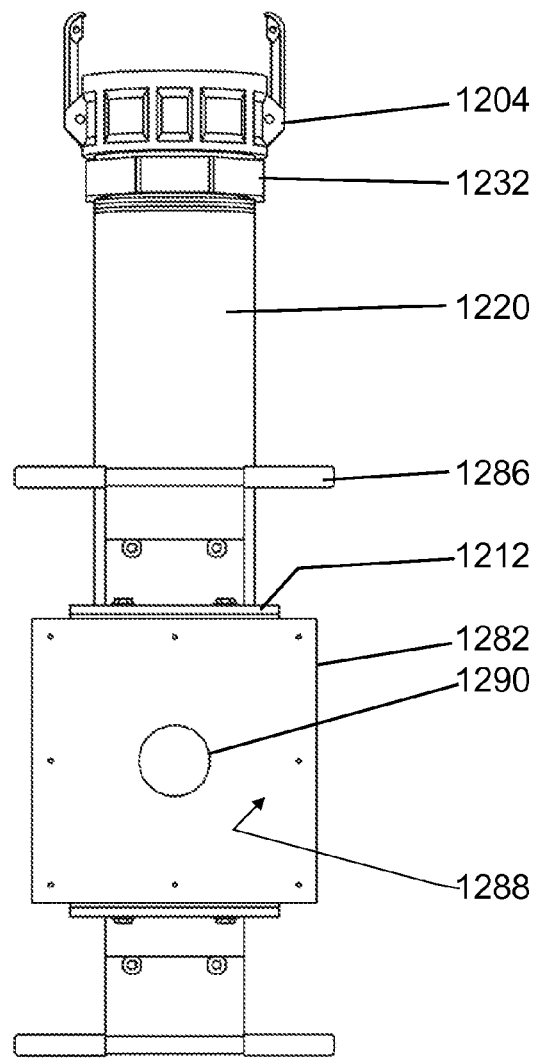
FIG. 8 is a front view of the second injector assembly.

FIG. 8 is a front view of injector assembly 1200. Several components introduced during the discussion of FIG. 7 are visible from a different perspective in FIG. 8. Aluminum faceplate 1282 is shown with the distal face 1288 which would be facing the proximal face 112 of ballistic panel 104 (see FIG. 6). The aluminum faceplate 1282 would be separated from the proximal face 112 of ballistic panel 104 by the faceplate 140 which is sized to extend beyond the void 108 in all directions. The injector assembly outlet 1290 is aligned with an opening in faceplate 140 to allow injection of a slurry of replacement material into the void 108.

Also visible in FIG. 8 are previously introduced components: cap 1204, coupling adapter 1232; injector body 1220, outlet valve 1212; and actuator 1286.

While injector assemblies may be made of various sizes, an injector assembly 1200 as shown in FIG. 8 may have a total height of approximately twenty inches from the lower actuator 1286 to the top of the cap 1204 (excluding the camlock).

Figure 9:
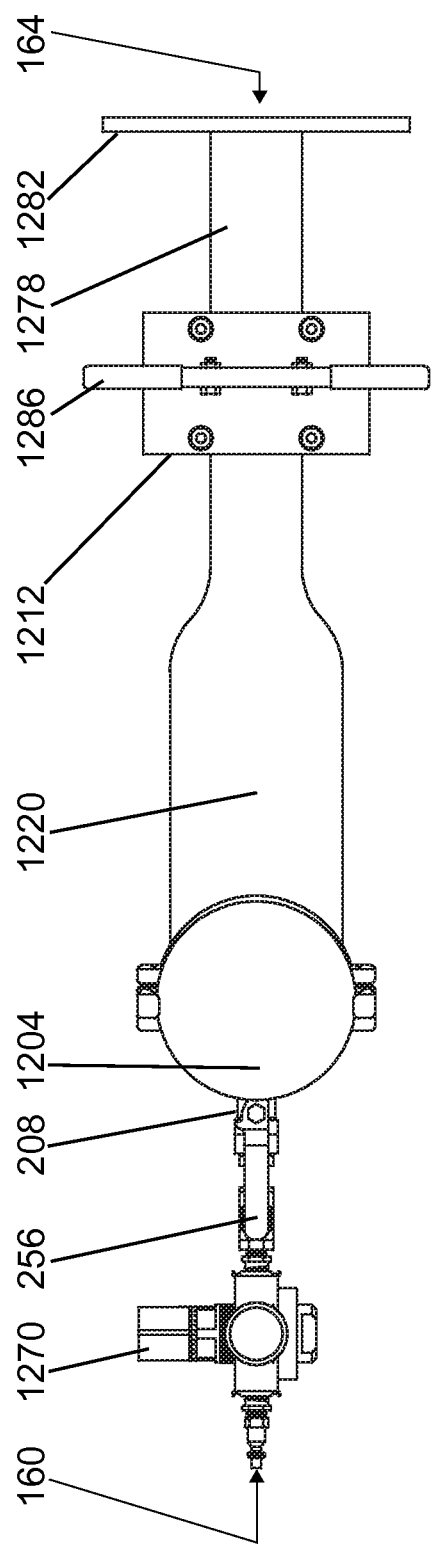
FIG. 9 is a top view of the second injector assembly.

FIG. 9 is a top view of injector assembly 1200. This view shows components previously introduced from other views. Moving from the inlet end 160 to the outlet end 164 the major visible components are: pressure regulator 1270, inlet valve 208 with inlet valve handle 256; cap 1204 with camlocks, injector body 1220, outlet valve 1212 with actuator 1286, outlet pipe 1278 with aluminum faceplate 1282.

ALTERNATIVES AND VARIATIONS

Alternative Materials.

While examples provided above have named materials that may be used for specific components such as aluminum, steel, plywood, brass, and PVC, those of skill in the art will recognize that other materials may be substituted. The decision to change material may impact the weight of the injector assembly or the cost of the injector assembly but those of skill in the art will understand those impacts and make decisions based on particular needs.

Scaling.

The overall volume of replacement material that is loaded into a injector assembly 200 or 1200 before being driven into the void 108 may be varied by altering the diameters and lengths of components between the outlet of the inlet valve 208 and the inlet out the outlet valve (212 or 1212). Changes to increase the volume will increase the weight of an empty injector assembly and the weight of a filled injector assembly but will decrease the need for many cycles of loading with replacement material to fill a large void 108.

Omission of Pressurization of Injector Assembly.

One of skill in the art will recognize that for certain uses of an injector assembly, it may be sufficient to fill the injector assembly with replacement material and open the outlet valve before opening the inlet valve so that there is not an intermediate act of pressurizing the injector assembly before opening the outlet valve. Such a deviation from the process set forth in this disclosure should be viewed as an alternative covered by the scope of this disclosure.

Use of Pressurized Gas other than Air.

While compressed air is a well-known item for use in construction sites including remote sites as air compressors are made with a variety of fuel options and tanks of compressed air are easy to carry to a remote site, the process does not require that the compressed gas be air. Other gases can be used providing that they are compatible with the replacement material (won't alter the replacement material) and safe for use around those performing the procedure.

Alignment of Inlet and Outlet.

While the examples of injector assemblies 200 and 1200 show an inlet approximately horizontal with the outlet, this is not a requirement. One of skill in the art will appreciate that a pressurized gas inlet could be placed out of horizontal alignment with the outlet. For example, an injector assembly inlet could be placed above the outlet. The inlet could even be placed above the removable cap.

If the inlet to the injector assembly was placed relatively high relative to the outlet valve, one could potentially forego the inlet valve 208 and simply use a valve at the source of the compressed gas (such as a tank of compressed gas) or the controls for a compressor to turn on and off the provision of compressed gas through a pressure regulator.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

What is claimed is:

1. A process to fill a void in a proximal face of a ballistic panel with a ballistic replacement material, the process comprising:
    obtaining an injector assembly comprising:
        a top end to be oriented with a vertical component with a removable cap such that the ballistic replacement material may be loaded into a cavity within the injector assembly, the removable cap located above the cavity such that gravity moves the ballistic replacement material downward into the cavity, a proximal end with a fitting suitable for connection to a pressurized gas source;

an inlet valve between the fitting and the cavity;

an outlet valve between the cavity and an outlet to be placed contiguous to the void through an opening in a void cover reversibly attached to the proximal face of the ballistic panel;

connecting the injector assembly to the void cover reversibly attached to the proximal face of the ballistic panel;

creating at least one vent hole to allow the ballistic replacement material entering the void to push air out of the void through the vent hole; and pushing at least a portion of the ballistic replacement material used to fill the void through at least one sequence of:

filling at least a portion of the cavity in the injector assembly with the ballistic replacement material through the top end of the injector assembly while the inlet valve and outlet valves are closed;

sealing the top end with the removable cap after filling at least the portion of the cavity;

opening the inlet valve to allow ingress of pressurized gas into the injector assembly; and opening the outlet valve to allow movement of the ballistic replacement material and pressurized gas through the outlet valve and the outlet continuous to the void through the opening in the void cover into the vented void.

2. The process to fill a void in a proximal face of a ballistic panel with ballistic replacement material of claim 1 wherein the pressurized gas is compressed air.

3. The process to fill a void in a proximal face of a ballistic panel with ballistic replacement material of claim 1 wherein a proximal end of the at least one vent hole passes through a portion of the void cover.

4. The process to fill a void in a proximal face of a ballistic panel with ballistic replacement material of claim 1 wherein the at least one vent hole does not pass through a portion of the void cover.

5. The process to fill a void in a proximal face of a ballistic panel with ballistic replacement material of claim 1 wherein a pressure of the pressurized gas is limited by a pressure regulator.

6. The process to fill a void in a proximal face of a ballistic panel with ballistic replacement material of claim 1 wherein the void after filling with the ballistic replacement material is processed to smooth a proximal face of the filled void and is marked so the filled void is not relied upon to stop bullets until after a test cylinder filled with the ballistic replacement material from a same batch as used for the ballistic replacement material that filled the void passes a test for ballistic stopping power.

7. The process to fill a void in a proximal face of a ballistic panel with ballistic replacement material of claim 1 wherein the void cover reversibly attached to the proximal face of the ballistic panel uses a first faceplate that covers the void and is connected to the proximal face of the ballistic panel by screws and a second faceplate attached to the proximal face of the first faceplate, the second faceplate having piping adapted to connect to the outlet valve of the injector assembly and provide a path for the ballistic replacement material and pressurized gas between the outlet valve and the opening in the first faceplate contiguous to the void in the proximal face of the ballistic panel.

8. The process to fill a void in a proximal face of a ballistic panel with ballistic replacement material of claim 1 wherein the outlet valve uses a push-pull actuator with a pair of handles on opposite sides of the outlet valve.

9. The process to fill a void in a proximal face of a ballistic panel with ballistic replacement material of claim 1 wherein the removable cap may be removed without a use of a threaded connection such that the removable cap may be replaced after insertion of the ballistic replacement material into the injector assembly without concern about the ballistic replacement material fouling a threaded connection.

10. The process to fill a void in a proximal face of a ballistic panel with ballistic replacement material of claim 1 wherein the step of creating the at least one vent hole to allow the ballistic replacement material entering the void to push air out of the void through the at least one vent hole comprises creating a channel though the proximal face of the ballistic panel above the opening in the void cover and angled downward to connect to a portion of the void that is distal to the proximal face of the ballistic panel.

11. The process to fill a void in a proximal face of a ballistic panel with ballistic replacement material of claim 1 wherein the step of connecting the injector assembly to the void cover reversibly attached to the proximal face of the ballistic panel is achieved by connecting an outlet side of the outlet valve to a proximal end of a proximal plate which provides a pathway from the outlet of the outlet valve through the opening in the void cover reversibly attached to the proximal face of the ballistic panel.

12. A process to fill a void in a proximal face of a ballistic panel with a ballistic replacement material, the process comprising:

obtaining an injector assembly comprising:

a top end to be oriented with a vertical component with a removable cap such that the ballistic replacement material may be loaded into a cavity within the injector assembly, a proximal end with a fitting suitable for connection to a pressurized gas source;

an inlet valve between the fitting and the cavity;

an outlet valve between the cavity and an outlet to be placed contiguous to the void through an opening in a void cover reversibly attached to the proximal face of the ballistic panel;

connecting the injector assembly to the void cover reversibly attached to the proximal face of the ballistic panel;

creating at least one vent hole to allow the ballistic replacement material entering the void to push air out of the void through the at least one vent hole;

opening the outlet valve to allow movement of the ballistic replacement material and pressurized gas through the outlet valve and the outlet continuous to the void through the opening in the void cover into the vented void; and pushing at least a portion of the ballistic replacement material used to fill the void through at least one sequence of:

filling at least a portion of the cavity in the injector assembly with the ballistic replacement material through the top end of the injector assembly while the inlet valve is closed and the outlet valve is open;

sealing the top end with the removable cap after filling at least the portion of the cavity; and opening the inlet valve to allow ingress of pressurized gas into the injector assembly to allow movement of the ballistic replacement material and pressurized gas through the outlet valve, the outlet contiguous to the void through the opening in the void cover and into the vented void.

13. A process to fill a void in a proximal face of a ballistic panel with a ballistic replacement material, the process comprising:
obtaining an injector assembly comprising:
an outlet end connected to the void through an opening in a void cover reversibly attached to the proximal face of the ballistic panel;
a top end to be oriented with a vertical component relative to the outlet end, the top end comprising a removable cap such that the ballistic replacement material may be loaded into a cavity within the injector assembly, the removable cap located above the cavity such that gravity moves the ballistic replacement material downward into the cavity, and
a gas inlet end with a fitting suitable for connection to a pressurized gas source;
connecting the injector assembly to the void cover reversibly attached to the proximal face of the ballistic panel;
creating at least one vent hole to allow the ballistic replacement material entering the void to push air out of the void through the at least one vent hole; and
pushing at least a portion of the ballistic replacement material used to fill the void through at least one sequence of:
filling at least a portion of the cavity in the injector assembly with the ballistic replacement material through the top end of the injector assembly,
sealing the top end with the removable cap after filling at least the portion of the cavity; and
using pressurized gas connected to the gas inlet end of the injector assembly to push the ballistic replacement material into the vented void.

14. The process to fill a void in a proximal face of a ballistic panel with ballistic replacement material of claim 13 wherein the gas inlet end with the fitting suitable for connection to the pressurized gas source has an inlet valve between the fitting and the cavity.

15. The process to fill a void in a proximal face of a ballistic panel with ballistic replacement material of claim 13 wherein control of the pressurized gas connected to the gas inlet end of the injector assembly to push the ballistic replacement material into the vented void is achieved without use of an inlet valve between the fitting and the cavity.

16. The process to fill a void in a proximal face of a ballistic panel with ballistic replacement material of claim 13 wherein the gas inlet end is substantially aligned with the outlet end.

17. The process to fill a void in a proximal face of a ballistic panel with ballistic replacement material of claim 13 wherein the gas inlet end forms a Y with the top end such that pressurized gas helps move the ballistic replacement material downward from the top end and eventually out the outlet end.

* * * * *